United States Patent
Duan

(10) Patent No.: US 11,144,315 B2
(45) Date of Patent: Oct. 12, 2021

(54) DETERMINING QUALITY OF AN ELECTRONIC GAME BASED ON DEVELOPER ENGAGEMENT METRICS

(71) Applicant: Roblox Corporation, San Mateo, CA (US)

(72) Inventor: Jianan Duan, Foster City, CA (US)

(73) Assignee: Roblox Corporation, San Mateo, CA (US)

(*) Notice: Subject to any disclaimer, the term of this patent is extended or adjusted under 35 U.S.C. 154(b) by 95 days.

(21) Appl. No.: 16/563,509

(22) Filed: Sep. 6, 2019

(65) Prior Publication Data
US 2021/0072981 A1 Mar. 11, 2021

(51) Int. Cl.
G06F 8/77 (2018.01)
G06F 11/36 (2006.01)
G06F 11/34 (2006.01)
G06F 8/30 (2018.01)

(52) U.S. Cl.
CPC ............ *G06F 8/77* (2013.01); *G06F 11/3438* (2013.01); *G06F 11/3604* (2013.01); *G06F 8/30* (2013.01)

(58) Field of Classification Search
USPC .......................................................... 717/101
See application file for complete search history.

(56) References Cited

U.S. PATENT DOCUMENTS

| 10,272,341 | B1 | 4/2019 | Blackwell | |
|---|---|---|---|---|
| 2009/0070734 | A1* | 3/2009 | Dixon | G06F 8/71 717/102 |
| 2011/0197176 | A1 | 8/2011 | Muharsky et al. | |
| 2012/0276993 | A1 | 11/2012 | Lerner et al. | |
| 2012/0317541 | A1* | 12/2012 | Kaulgud | G06F 11/3604 717/102 |
| 2013/0305218 | A1* | 11/2013 | Hirsch | G06F 8/36 717/106 |
| 2013/0326467 | A1* | 12/2013 | Nair | G06F 11/3664 717/101 |
| 2014/0137072 | A1 | 5/2014 | Hey, Jr. et al. | |
| 2015/0331674 | A1 | 11/2015 | Ng et al. | |
| 2015/0355998 | A1* | 12/2015 | Kogan-Katz | G06F 8/71 717/101 |

(Continued)

OTHER PUBLICATIONS

Ahn, "Designing Games with a Purpose", Retrieved from the Internet: https://https://www.cs.cmu.edu/~biglou/GWAP_CACM.pdf (retrieved on Oct. 30, 2019), Aug. 31, 2008, pp. 58-67.

(Continued)

*Primary Examiner* — Jason D Mitchell
(74) *Attorney, Agent, or Firm* — IP Spring

(57) ABSTRACT

A technique determines a quality of an electronic game based at least in part on the time spent by a game developer to design the electronic game. While operating a game development tool during the design of the game, the number of actions taken using the game development tool are counted for a plurality of time frames. If the number of actions for any particular time frame meet a threshold number of actions, then a duration of that time frame is added to a value of a total developer time for the electronic game. Other time frames, in which the number of actions fails to meet the threshold, do not have their time frame durations added to the value of the total developer time. A higher quality rating corresponds to longer total developer time.

20 Claims, 7 Drawing Sheets

(56) References Cited

U.S. PATENT DOCUMENTS

| | | | |
|---|---|---|---|
| 2017/0169382 A1* | 6/2017 | Thapliyal | G06Q 10/1093 |
| 2017/0357809 A1* | 12/2017 | Smith | G06Q 10/06398 |
| 2018/0004623 A1* | 1/2018 | Krishnamoorthy | G06F 11/3034 |
| 2018/0088938 A1* | 3/2018 | Gullen | G06F 8/77 |
| 2018/0107455 A1* | 4/2018 | Psistakis | G06F 8/71 |
| 2018/0124205 A1* | 5/2018 | Nitsan | G06F 11/3419 |
| 2018/0345152 A1* | 12/2018 | Duan | G06F 16/7867 |
| 2020/0005219 A1* | 1/2020 | Stevens | G06F 8/71 |
| 2020/0310842 A1* | 10/2020 | Yen | G06F 11/366 |

OTHER PUBLICATIONS

WIPO, International Search Report for International Patent Application No. PCT/US2019/051392, dated Nov. 13, 2019, 3 pages.
WIPO, Written Opinion for International Patent Application No. PCT/US2019/051392, dated Nov. 13, 2019, 9 pages.

* cited by examiner

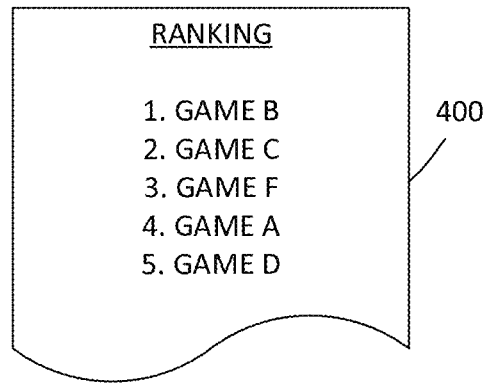
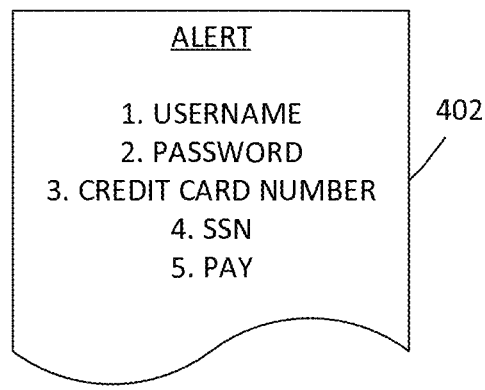
FIG. 4
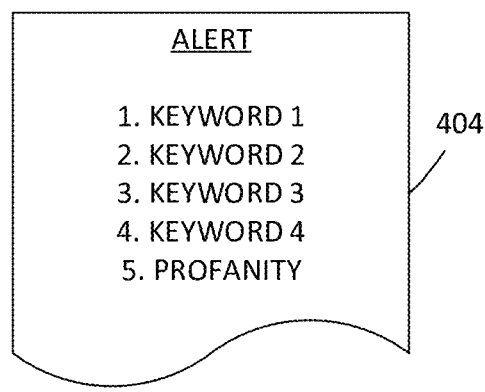

DETERMINING QUALITY OF AN ELECTRONIC GAME BASED ON DEVELOPER ENGAGEMENT METRICS

TECHNICAL FIELD

This disclosure relates generally to computer-based gaming, and more particularly but not exclusively, relates to methods, systems, and computer readable media to determine quality of an electronic game.

BACKGROUND

An online electronic game is a video game that is made available and played generally over a computer network, such as the Internet. Using modern computing devices, such as personal computers, mobile telephones, laptops, etc., a user (e.g., a player) can play an online electronic game in a solitary manner or with multiple other players.

Typical online gaming platforms allow players to navigate their avatars within a three-dimensional (3D) world. Using a mouse, keyboard, or other input mechanisms provided on their client devices, the users can control the running, walking, climbing, flying, etc. of their avatars through buildings, fields, forests, parks, mountains, and other environments in the 3D world, with various elements such as trees, walls, pillars, clouds, and other structures/objects being rendered as visual graphical representations within the 3D world presented by an electronic game.

The persons or other entities that design and assemble the various graphical objects, rules of gameplay, audio, animation, etc. for electronic games are often referred to as "game developers." Professional game developers may be employed by companies whose primary business involves manufacturing online games, which may then be provided to players or other consumers via an online gaming service provider, or via download, or via some other source. In some contexts, game developers may be solitary individuals that may not necessarily work under the direction/employment of a company engaged in the electronic gaming industry, such as independent game developers or other persons (such as amateur game developers) who may have anywhere from a passing-to-high interest in developing electronic games. Indeed, many online gaming platforms allow players themselves to create their own electronic games, which may then be published/uploaded to an online gaming platform or other online source for other players to access (e.g., download) and play.

The skill level and motivation of such disparate types of game developers and other persons who make electronic games available to consumers, as well as other factors, result in variations in the quality of the electronic games. The quality of electronic games may range from relatively high quality (e.g., rich graphics, complex gameplay rules, etc.) to relatively low quality (e.g., sloppy graphics, rudimentary gameplay rules, incomplete/non-functional features, etc.). Players often enjoy high-quality electronic games, but identifying which particular electronic games are higher quality versus lower quality, without first actually playing the electronic games themselves, can often be difficult.

SUMMARY

According to an aspect, a method includes: determining a number of actions performed using a game development tool, wherein the number of actions are performed during at least one time frame and wherein the actions correspond to a particular game designed using the game development tool; generating a signal having content that represents the number of actions taken during the at least one time frame; and sending the signal to an agent computer to enable determining a quality of the game from the content of the signal.

According to another aspect, a non-transitory computer-readable medium has computer-readable instructions stored thereon, which in response to execution by a processor, cause the processor to perform or control performance of operations that include: determining a number of actions that are performed using a game development tool, wherein the number of actions are performed during at least one time frame and wherein the actions correspond to a particular game designed using the game development tool; generating a signal having content that represents the number of actions taken during the at least one time frame; and sending the signal to an agent computer to enable a determination of a quality of the game from the content of the generated signal.

According to still another aspect, a system includes: a non-transitory computer-readable medium with computer-executable instructions stored thereon for a game development tool and a computer program associated with the game development tool; and a processor coupled to the computer-readable medium, and operable to execute the instructions to render a user interface for the game development tool and to perform or control performance of operations that include: determine a number of actions performed using a game development tool, wherein the number of actions are performed during at least one time frame and wherein the actions correspond to a particular game designed using the game development tool; generate a signal having content that represents the number of actions taken during the at least one time frame; and send the signal to an agent computer to enable a determination of a quality of the game from the content of the generated signal.

BRIEF DESCRIPTION OF THE DRAWINGS

FIG. 4 shows example information pertaining to the quality of an electronic game and which may be based at least in part on the developer time while using the game development tool of FIG. 1, in accordance with some implementations.

DETAILED DESCRIPTION

Figure 1:
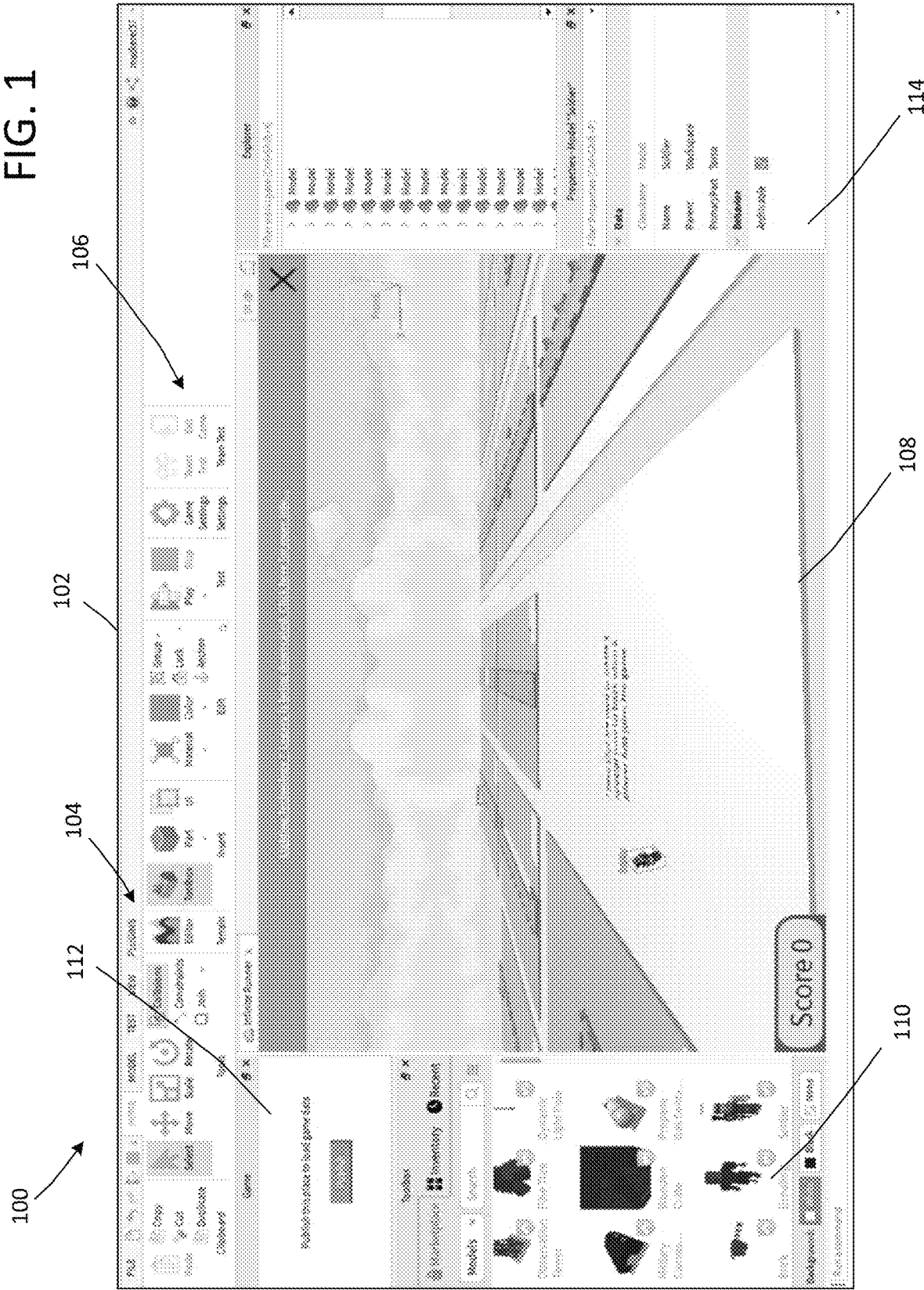
FIG. 1 shows an example of a game development tool, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks in an electronic game, by providing techniques to determine a quality of an electronic game based at least in part on the time spent by a game developer to design the electronic game. While operating a game development tool during the design of the game, the number of actions taken using the game development tool are counted for a plurality of time frames. If the number of actions for any particular time frame meet a threshold number of actions, then a duration of that time frame is added to a value of a total developer time for the electronic game. Other frames, in which the number of actions fails to meet the threshold, do not have their time frame durations added to the value of the total developer time. Electronic games with relatively higher values (lengthier) for developer time are determined to be higher in quality, while electronic games with relatively lower values (shorter) for developer time are determined to be lower in quality. Thus, the quality of an electronic game may be extrapolated without having to actually play the electronic game.

FIG. 1 shows example of a game development tool 100, in accordance with some implementations. The game development tool 100 may have a user interface 102. One example of the game development tool 100 is Roblox™ Studio from Roblox™ Corporation. Other game development tools provided by other electronic game companies may be used in various embodiments. The game development tool 100 may be a client-based tool (e.g., downloaded and installed on a client device, and operated from the client device), a server-based tool (e.g., installed and executed at a server that is remote from the client device, and accessed and operated by the client device), or a combination of both client-based and service-based elements.

The game development tool 100 may be operated by a game developer or any other person who seeks to create an electronic game that may be published and played by electronic game consumers. The user interface 102 may be rendered on a display screen of a client device, so as to enable the game developer to interact with the game development tool 100 using actions such as typing, highlighting, selecting, drag and drop, clicking, and so forth via a mouse, keyboard, or other input device configured to communicate with the user interface 102.

The user interface 102 may include a menu bar 104, a tool bar 106, a workspace pane 108, and a plurality of secondary panes (such as a toolbox pane 110). Depending on the particular implementation, the user interface 102 may include alternative or additional elements, arrangements, operational features, etc. of the game development tool 100 than what is shown and described herein with respect to in FIG. 1. Thus, it is understood that the various elements and operation of the example game development tool 100 and user interface 102 shown in FIG. 1 are for purposes of illustration and explanation herein and that variations/modifications thereof are possible.

For the sake of explanation, the game development tool 102 will be described herein in the context of creating an "Infinite Runner" game. An "Infinite Runner" game may be, for example, a game in which the objective of the player is to dodge obstacles and stay alive the longest. The game developer can design/create various graphical elements and other game elements for the "Infinite Runner" game, such as hazards, terrain, buildings, audio effects, timers, avatars, and so forth. "Infinite Runner" is one example; other types, themes, templates, etc. of other electronic games may include racing, combat, flying, castle, puzzle, city, village, outer space, etc.

The menu bar 104 can include a plurality of selectable options, such as HOME and MODELS selections shown in FIG. 1 that enable the game developer to access and use various tools to build (including customization) the electronic game. Other examples of the selectable options shown in FIG. 1 for the menu bar 104 may include: a TEST selection that enables the game developer to test the electronic game; a VIEW selection that enables the game developer to control the viewing layout and content of the user interface 102, including the content and arrangement of the workspace pane 108 and the secondary panes; a PLUGINS section that enables the game developer to install plugins for the electronic game; and so forth.

The tool bar 106 may provide various buttons and pull-down menus that the game developer can select (such as by clicking with a mouse) in order to access a particular tool to build the electronic game. Some examples of the various selectable buttons of the tool bar 106 of FIG. 1 can include: a MOVE button to move a particular graphical object within the workspace pane 108; a SCALE button to change a size of the graphical object; a ROTATE button to rotate an orientation of graphical object; a MATERIAL button to select a composition (e.g., wood, metal, etc.) of the graphical object; a COLOR button to select a color of the graphical object; a TERRAIN button to generate terrain effects such as grass, rocks, brush, etc.; a TOOLBOX button to populate the toolbox pane 110 with template objects (e.g., swords, towers, trees, characters, shapes, images, audio clips, and other graphical/audio elements) that can be dragged and dropped into the workspace pane 108; a PLAY button to play and stop the electronic game; a GAME SETTINGS button to specify configuration settings for the game, such as which players are allowed to play the game (e.g., friends), walking speed of a player, and other options; and so forth.

As stated above, the toolbox pane 110 can be one of a plurality of secondary panes in the user interface 102. Another secondary pane 112 can include selectable commands to publish the electronic game, such as by uploading the electronic game to a game server for viewing and playing by players and other game consumers. Further one or more secondary panes 114 may present properties information for viewing and/or editing by the game developer, a command bar field to enter script/coding, metadata and settings, and so forth. Any number of secondary panes may be presented by the game development tool 100 via the user interface 102, depending on which information, tools, commands, etc. that the game developer wishes to view or use.

The workspace pane 108 presents a view of the electronic game that the game developer is building. In this "Infinite Runner" example, the workspace pane 108 is rendering a three-dimensional (3D) terrain with land and water, and the game developer can insert and customize the various elements in the 3D terrain using the example tools described above. For instance, during the process of building an electronic game, the game developer can drag and drop a template of a tower from the toolbox pane 110 into a desired location in the 3D terrain rendered in the workspace pane 108, and can then manipulate or otherwise select the size, orientation, material, color, surface texture, and other audio-visual effects associated with the tower.

The game developer's interaction with the game development tool 100 via the user interface 102, such as dragging and dropping, clicking on buttons, selecting from a pull-down menu, resizing, and various other actions in connection with creating an electronic game, are examples of the actions that may be tracked during time frames in order to determine a quality of the electronic game, in a manner that will be described in more detail below.

Figure 2:
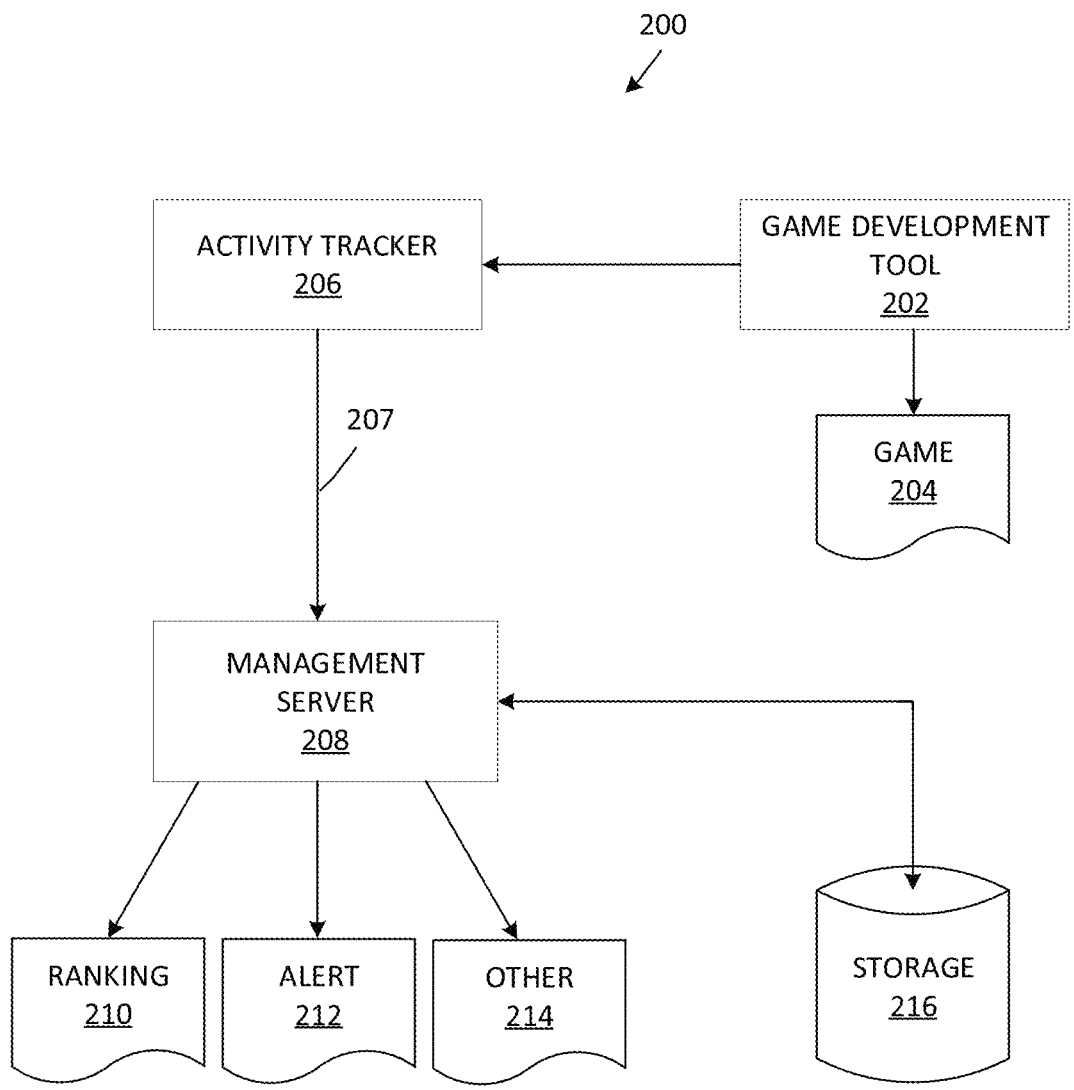
FIG. 2 is a block diagram that shows example elements of a system that can use developer time to determine the quality of an electronic game, in accordance with some implementations.

FIG. 2 is a block diagram that shows example elements of a system 200 that can use developer time to determine the quality of an electronic game, in accordance with some implementations. Specifically, system 200 may be a subsystem of an overall system architecture (shown and described in more detail with respect to FIG. 6), wherein FIG. 2 depicts the primary elements of the system 200 that may be involved in connection with determining the quality of the electronic game.

The various elements of the system 200 are shown in FIG. 2 as discrete/separate elements for purposes of illustration and explanation. According to some embodiments, it is possible to combine some of these elements into a single element or device, while in other embodiments, these elements may be distributed across a network. For example, in a client-server implementation, elements associated with the use of a game development tool (such as the game development tool 100 of FIG. 1) may be located and operated at a client device of the game developer, while elements associated with determining the quality of the electronic game may be located at a server remote from the client device. As another example, all or most of the elements of the system 200 may be located at the client device, or all or most elements of the system 200 may be located at a server—in either case, the game developer, a system administrator, or other entity can access the appropriate tool, functionality, feature, etc. based on their access rights.

The system 200 includes a game development tool 202 that may be used by the game developer to design an electronic game 204. An example of the game development tool 202 is the game development tool 100 of FIG. 1.

An activity tracker 206 may be operatively coupled to or otherwise in communication with the game development tool 202. According to some embodiments, the activity tracker 206 may be in the form of a computer program or other computer-readable instructions stored on a non-transitory computer-readable medium and executable by one or more processors. The activity tracker 206 may be operable to track the actions that are performed over time by the game developer while using the game development tool 202.

The activity tracker 206 may be an external program that interfaces with the game development tool 202 in some embodiments, or may be integrated into the programming of the game development tool 202 in some embodiments. The activity tracker 206 may operate as a daemon, background process, or other hidden application such that the game developer that is using the game development tool is unable to access the activity tracker or associated data while the game development tool 202 is being operated. The activity tracker 206 is inaccessible to the game developer such that the game developer will be unable to disable or modify programming of the activity tracker 206.

In some embodiments, a game developer or other person that is using the game development tool is provided with information that the game development tool 202 includes or works in conjunction with the activity tracker 206. The game developer may be presented with options to allow or disallow use of the activity tracker 206, or to choose the type of activity information that the activity tracker 206 can access. If the game developer chooses to disallow the activity tracker 206, developer actions within the game development tool 202 are not tracked and the techniques described herein to calculate game rankings based on developer time are not utilized. The game developer may be presented with further options to select whether and how data related to actions performed within the game development tool may be stored or used. For example, the game developer may choose to permit temporary storage of activity data (e.g., for one or more time frames), and choose to disallow permanent storage of activity data.

Figure 3:
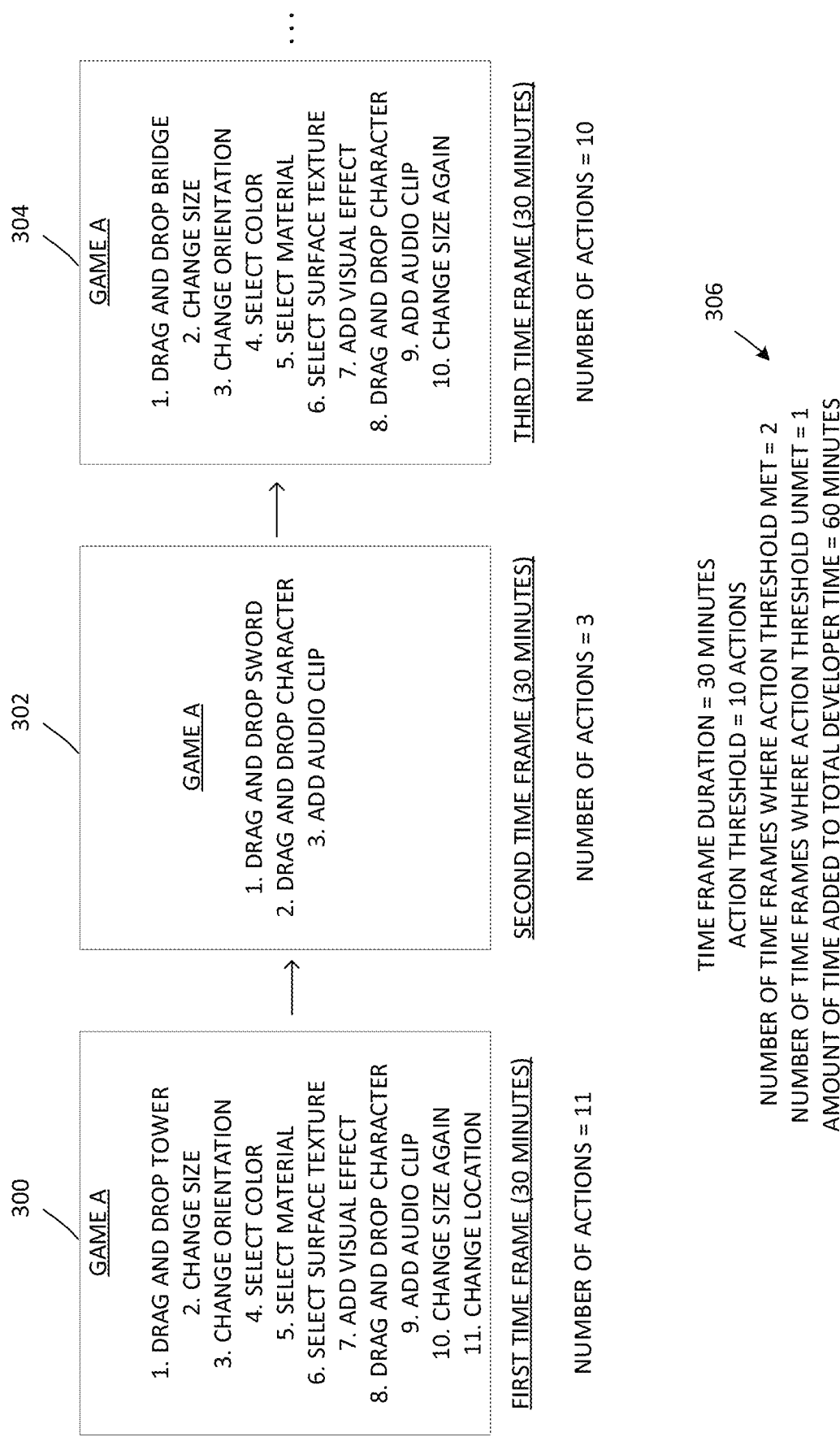
FIG. 3 shows example actions and time frames, associated with operating the game development tool of FIG. 1, that can be used to determine the developer time for an electronic game, in accordance with some implementations.

As will be further described with respect to FIG. 3, when permitted by the developer, the activity tracker 206 can identify the actions that are taken by the game developer while using the game development tool 202, count a number of these actions that are taken over at least one time frame, and generate a signal 207 having content that represents the number of actions taken during the time frame(s). The content in the signal 207 may be in the form of data (e.g., the number of actions in each time frame) that is obtained by the activity tracker 206, or may have a relatively more structured form such as a report that contains not only the data that is collected by the activity tracker 206 but also an analysis or computation performed by the activity tracker 206 based on the collected data.

In some embodiments, the activity tracker 206 can send the signal 207 to one or more management servers 208. The management server 208 may be owned and operated by an online gaming service provider, for example, and can take the form of or can be in communication with an agent computer of a system administrator or other agent that evaluates the quality of electronic games. In some embodiments where the activity tracker 206 resides at least in part in the management server 208, the signal 207 can be sent from the activity tracker 206 to a processor or other element of the management server 208/

In some embodiments, the management server 208 is operable to receive the signal 207 from the activity tracker 207 and to process the content contained in the signal 207 to determine the quality of the electronic game 204. For instance, the management server 208 may be operable to determine a number of actions taken by the developer during a time period, and if the number of actions exceeds a threshold, add a duration of that time period to a total developer time for the game 204.

Based on the total developer time for the electronic game 204, the management server 208 can then compute a quality for the game 204, such as a quality that increases as the total developer time increases. A rationale for this relationship is that the quality of the electronic game 204 can be expected to be higher when the value of the total developer time is relatively lengthy, since a lengthy developer time suggests that the game developer has invested more effort to enhance the details, complexity, audiovisual effects, etc. of the electronic game 204. In comparison, the quality of the game 204 can be expected to be lower when the value of the total developer time is relatively short, such as when the game developer has invested less attention to detail in designing the electronic game 204.

Based on the determined quality, the management server 208 can output a ranking 210 for the electronic game 204, an alert 212, or some other output 214. The ranking 210 for the electronic game 204 can be a high ranking, low ranking, or somewhere in between a high ranking and a low ranking, relative to the determined qualities of other electronic games that were determined also based on their corresponding total developer times. In some embodiments, the ranking 210 may be a numeric ranking. The ranking 210 may be represented in a hit list, such as a result of a query when a player searches for electronic games to play.

A small value for the total developer time, which in turn results in a low quality rating for the electronic game 204, is also potentially indicative of some malicious aspect associated with the electronic game 204. That is, the electronic game 204 may be of low quality because the electronic game 204 is malicious in some way. In such a situation, the management server 208 may correlate the low quality rating for the electronic game 204 with data contained in a storage device 216, in order to generate the alert 212.

The storage device 216 may store profile information and statistical information of the game developer, keywords for a word filter for scanning the electronic game 204, and other information that the management server 208 may use in conjunction with the total developer time for the electronic game 204 in order to determine whether to generate the alert 212. The generated alert 212 may then be sent to a system administrator or other agent for further evaluation of the electronic game 204 and for remedial action (as necessary) such as: disabling access to, deleting, or modifying the electronic game 204 if the electronic game 204 is determined to be malicious; removing access privileges of the game developer if the electronic game 204 is determined to be malicious; approving the electronic game for publication if the electronic game 204 is determined to not be malicious; and so forth. In some embodiments, the evaluation and remedial actions may be automated.

Various operations can be performed automatically. For example, certain rules may be defined by/for the management server 208, wherein such rules are sufficiently strict to guarantee relatively low false negatives regarding the quality/maliciousness of an electronic game. For instance, if a developer has been publishing more than x number of electronic games and y % of the electronic games has been labeled malicious in the past, a rule may be defined: if y is above a certain threshold and the score from the development time for a particular electronic game is lower than a value_score_, then this electronic game will be automatically moderated or may be otherwise flagged for further investigation.

As one example, the electronic game 204 may be determined to be a malicious game because the electronic game 204 is a scam game, such as if the electronic game 204 was created by the game developer in order to dishonestly obtain personal and/or financial information of its players. Such types of malicious games typically do not have significant investment in developer time, since the game developer is focused more on obtaining the personal/financial information of the players, rather than improving the graphics, content, game play complexity, and other positive enhancements of the electronic game 204. Moreover, the malicious game developer expects that the malicious game will likely be filtered and/or otherwise disabled after a limited number of players fall victim to it, and so there is less incentive to invest significant developer time into a single electronic game that may have a relatively short lifespan. The malicious game developer recognizes that it would likely be more efficient and effective to invest shorter developer time in creating many electronic games of low quality, rather than spending longer developer time in creating just a few electronic games of higher quality.

Another example of a malicious game is an electronic game that attempts to crash or otherwise detrimentally affect the performance of the server(s) of the online gaming service provider. For example, the malicious game developer may attempt to upload dozens or even hundreds of electronic games per day to the server. The high volume of these electronic games could usurp the server capacity or slow down the servers of the online gaming service provider. Moreover, these malicious games could potentially appear in and crowd hit lists that are provided in response to search queries by legitimate players, thereby making it more difficult for these players to identify electronic games that may be of interest for playing. As with the malicious games described above that attempt to dishonestly obtain players' personal/financial information, the malicious games that attempt to slow down the servers would typically be characterized by short developer times (low quality).

Still another example of a malicious game is an electronic game having content that is inappropriate for the gaming services provided by the online gaming service provider. For instance, online gaming service provider's primary products may be electronic games for children, and a malicious game developer has attempted to upload an electronic game that is disguised or provided as a children's game but instead has adult-oriented content. As with the other examples of malicious games described above, such electronic games with inappropriate content may be characterized by relatively shorter developer times. The use by the management server 208 of the relatively shorter developer times, in conjunction with data stored in the storage device 216, in order to generate the alert 212, will be described in further detail with respect to FIGS. 3 and 4. A remedial action, such as blocking the electronic game from access, deleting the electronic game, redacting portions of the electronic game, etc. may be taken where the game has inappropriate content.

While the embodiments described herein use the value of the total developer time to determine a quality of the electronic game 204, it is understood that a low quality determination does not necessarily mean that there is an underlying malicious aspect associated with the electronic game 204. For example, the game developer may be trying to legitimately design a game for the use and enjoyment of other players, except that the game developer has been too busy to spend significant time using the game development tool. As another example, the game developer may be relatively inexperienced with creating electronic games or may only have a marginal interest in investing significant time in creating electronic games.

In all of these and other circumstances, the electronic game 204 could have a relatively short total developer time associated with it, and thus would receive a relatively lower quality rating. The lower quality rating would be accurate in the sense that the electronic game 204 could be lacking in the rich audiovisual details and other enhancements of higher quality electronic games (and hence would suffer from a lower position in the ranking 210), but these legitimate but lower quality electronic games are not otherwise malicious. Thus, if the short developer time (low quality rating) does not trigger the alert 212 (for example, if the electronic game 204 is determined by the management server 208 to not have the characteristics of a malicious game), such electronic game 204 can remain active in the system 200 for further development by the game developer or can eventually completely fall off the ranking 210 if the game developer abandons further effort to develop the electronic game 204.

In another situation, if the short developer time (low quality rating) of the legitimate electronic game 204 does indeed trigger the alert 212 for some reason, the system administrator can examine the alert 202 and the electronic game 204, and can determine that the electronic game 204 is legitimate—the electronic game 204 can thus be permitted to continue to exist for further development or may eventually fall off the ranking 210 if the game developer abandons further effort.

The other output 214 from the management server 208 can take the form of any other data related to the developer time for the electronic game 204. The system administrator or other agent of the online gaming service provider may use this data for performance monitoring, troubleshooting, statistics compilation, and other purposes. For the sake of brevity, such other output 214 and use thereof will not be described in further detail herein.

FIG. 3 shows example actions and time frames, associated with operating the game development tool 100 of FIG. 1 (and/or the game development tool 202 of FIG. 2), that can be used to determine the developer time for an electronic game, in accordance with some implementations. In FIG. 3, the game developer may be designing an "Infinite Runner" electronic game (entitled "GAME A"), for the purposes of explanation herein.

The increments of time spent by the game developer using the game development tool 100 may be defined in terms of time frames of a particular duration. The example duration of each time frame 300, 302, and 304 in FIG. 3 is 30 minutes. The duration of the time frame can be set to any suitable value by a system administrator or other entity (such as the management server 208) that controls the operation of the activity tracker 206, and/or the duration of the time frame may be set automatically.

Such entity (such as the management server 208) may also define a threshold number of actions that the game developer needs to take with the game development tool 100 during the duration of the time frame, in order for the duration of that time frame to be added to a value of a total developer time that is being calculated for GAME A by the activity tracker 206. In the example of FIG. 3, the threshold number of actions is 10 actions. Thus, if the activity tracker 206 detects that the game developer performs 10 or more actions using the game development tool 100 during a particular time frame, then the activity tracker 206 adds 30 minutes from that particular time frame to the running total of the developer time for GAME A. However, if the activity tracker 206 detects that the game developer performs less than 10 actions using the game development tool 100 during a particular time frame, then the activity tracker 206 does not add the duration of that time frame to the running total of the developer time for GAME A.

The beginning of a particular time frame can be defined when the activity tracker detects a first action that is undertaken by the game developer using the game development tool 100, and then the activity tracker 206 sets a 30-minute duration of that particular time frame, measured from the occurrence of that first action. For example, for the time frame 300 in FIG. 3, the beginning of the time frame 300 corresponds to a first action when the game developer drags and drops a template of a "tower" from the toolbox pane 110 to a desired location in the workspace pane 108. Thereafter, the activity tracker 206 measures off 30 minutes from that first action, and counts the number of other actions that are performed during that 30 minutes. These other actions may include in FIG. 3: changing a size of the tower, changing an orientation of the tower, selecting a color of the tower, selecting a material for the tower (e.g., wood, stone, metal, etc.), selecting a surface texture of the tower (e.g., smooth, rough, etc.), adding a visual effect to the tower (e.g., smoke or flames), dragging and dropping a character onto the tower (e.g., a villain), adding an audio clip (e.g., audio for the villain), changing the size of the tower again, and changing the location of the tower. The total number of these actions that occur during the 30-minute duration of the time frame 300 is thus 11 actions in this example, with the drag and drop action being the first action that occurs in the time frame 300 and the changing location action being the last action that occurs in the time frame 300.

The beginning of the next time frame 302 can be defined when the game developer undertakes a first action, after the expiration of the time duration of the previous time frame 300. The first action in the time frame 302 can occur immediately after the expiration of the first time frame 300 (such as if the game developer is continuously working on GAME A), or can occur minutes, hours, days, etc. after the expiration of the time frame 300, such as if the game developer is intermittently working on GAME A.

In the example of FIG. 3, the time frame 302 begins when the activity tracker 206 detects that the game developer has dragged and dropped a template of a "sword" from the toolbox pane 110 to a desired location in the workspace pane 108. However, the game developer does not perform many other actions with the game development tool 100 during the time frame 302—only two other actions are detected by the activity tracker 100 before the expiration of the 30-minute duration of the time frame 302: dragging and dropping a character onto the workspace pane 108 and adding an audio clip, for a total of 3 actions taken during the time frame 302, which is under the threshold of 10 actions.

For the next time frame 304, the activity tracker 206 detects that the game developer has performed 10 actions with the game development tool 100, which is at (e.g., meets) the threshold of 10 actions. These 10 actions include: dragging and dropping a template of a "bridge" from the toolbox pane 110 to the workspace pane 108, changing a size of the bridge, changing an orientation of the bridge, selecting a color of the bridge, selecting a material for the bridge, selecting a surface texture of the bridge, adding a visual effect to the bridge, dragging and dropping a character onto the bridge, adding an audio clip, and changing the size of the bridge again.

Further actions and timeframes can then occur after the time frame 304. At the completion of each time frame, the activity tracker 206 can compile data 306 to send in the signal 207 to the management server 208. For instance, in FIG. 3, the time frames 300 and 304 encompassed a number of actions (11 and 10 actions, respectively) that met the threshold of 10 actions. Thus, the activity tracker 206 adds 60 minutes (30 minutes from each of the time frames 300 and 304) to the running total for the developer time for GAME A, and reports the 60 minutes to the management server 208 in the signal 207. Since the time frame 302 encompassed a number of actions (3 actions) that is less than the threshold of 10 actions, the activity tracker 206 does not add the 30-minute duration of the time frame 302 to the running total for the developer time for GAME A.

In some embodiments, the activity tracker 206 performs the calculations for updating the current value of the total developer time, and sends the updated value to the management server 208 via the signal 207. In other embodiments, the activity tracker 206 may send relatively raw data to the management server 208 via the signal 207, and the management server 208 performs the calculations to update the total developer time—for example, the activity tracker 206 may report "2" time frames where the action threshold was met, and then the management server 208 may perform the calculations to determine that "2" time frames correspond to 60 minutes and then adds the 60 minutes to the running total for the developer time. As another example, a count of actions for each time frame may be provided to the management server 208.

The activity tracker 206 may be programmed in a number of ways to identify actions that are to be counted against the threshold for a time frame. In some embodiments, the activity tracker 206 may be programmed to be relatively less discriminatory (e.g., all or most actions using the game development tool 100 are counted against the action threshold). These actions can include the more substantive actions such as changing a color of a graphical object, as well as less substantive actions such as clicking on a menu to view the contents of the menu but not making a selection from the menu, performing an "undo" operation, etc. In other embodiments, the activity tracker 206 can be programmed to have relatively higher discrimination as to which actions to count against the threshold—for example, "undo" operations or other trivial operations may not be counted against the threshold.

The activity tracker 206 may also be configured to determine whether actions should be fully completed in order to be counted against the threshold. For instance, changing a color of a graphical object could involve three sequential operations: selecting/highlighting the graphical object for which a color change is desired, opening a menu from the toolbar 106 that contains a color palette, and selecting the desired color from the color palette. The activity tracker 206 can be programmed to consider these three operations as "1" collective action that is completed and counted against the threshold, or the activity tracker 206 may be programmed to consider these operations as 1, 2, or 3 actions that are counted against the threshold depending on which of the these three operations were completed.

Still further enhancements and modifications may be provided, individually or in combination, in various embodiments. For instance, some actions may be more heavily weighted than other actions in terms of a count against the threshold. For example, performing a drag and drop from the toolbox pane 110 may be given move weight (e.g., worth 5 actions counted against the threshold) than changing a color of an object (e.g., worth only 1 action counted against the threshold), with the rationale being that the game developer has to spend more time and effort locating and selecting a template object from the toolbox pane 110 and then navigating to a desired location in the workspace pane 108 where the selected object is to be dropped. Thus, if the game developer performs certain actions that are more involved/complex (and thus more heavily weighted), then the chances are higher that the threshold number of actions will be met for the time frame when such actions are performed and so the duration of the time frame will be added to the total developer time.

As another example, the activity tracker 206 may be configured in some embodiments to make adjustments to the total developer time, in an attempt to obtain a closer correlation between the developer time and quality. For instance, an inexperienced or unskilled game developer may perform a large number of actions to create an electronic game, with many "deletion" and "undo" actions and other worthless actions throughout the process since the game developer is making mistakes and is still trying to become more familiar with the game development tool 100, the user interface 102, and the process itself for creating the electronic game. Such large number of actions can result in a correspondingly large number of time frame durations being added to the total developer time of the electronic game, thereby potentially indicating a "high" quality electronic game for which significant developer time was incurred, even though in reality, the electronic game may be very rudimentary or poorly designed (low quality).

Some embodiments of the activity tracker 206 and/or the management server 208 can be configured to detect the large number of deletions, undo actions, etc. as being indicative of an inexperienced/unskilled game developer, and to reduce the value of the total developer time by some amount to compensate for the ineffective design time and thus provide a closer correlation between the (reduced) total developer time and quality. User profile information from the storage device 216 may also be used, if permitted by the game developer, to identify whether the game developer is inexperienced, in order to assist the activity tracker 206 and/or the management server 208 in determining whether to reduce the total developer time for the electronic game.

In some embodiments where multiple game developers are collaborating to develop an electronic game, the multiple game developers may be considered as a single game developer (single entity), where such multiple game developers are using a group account. As such, the development time spent by any single game developer can be summed with the development time spent by the other game developers.

Conversely, a skilled game developer may be more efficient and knowledgeable as to which actions should be performed and when, during the course of building the electronic game. As such, the total developer time for that electronic game may be relatively short, thereby potentially providing a misleading "low" quality rating for that electronic game. Some embodiments of the activity tracker 206 and/or the management server 208 can be configured to detect a smaller number of deletions, undo actions, etc. as being indicative of an experienced/skilled game developer, and to increase the value of the total developer time by some amount to compensate for the more efficient design time and thus provide a closer correlation between the (increased) total developer time and quality. Again, user profile information from the storage device 216 may also be used (with user permission) to identify whether the game developer is experienced, in order to assist the activity tracker 206 and/or the management server 208 in determining whether to increase the total developer time for the electronic game.

The type of electronic game may also be considered by the management server 208 and/or activity tracker 206 when determining whether to make an adjustment in the value of the total developer time, in order to obtain a closer correlation between developer time and quality. For instance, a puzzle game is a relatively simple game that may not incur significant developer time, and yet could be a very high quality (well-designed) puzzle—however, the short developer time could potentially result in a low quality determination. Conversely, a combat game is a more complex game that could incur more significant developer time, which could potentially result in a high quality determination—yet in reality, the combat game may be poorly developed (low quality). To provide closer correlation between quality and developer time in these scenarios, the management server 208 and/or activity tracker 206 can determine the type of electronic game, and then increase the value of the total developer time for the puzzle game and decrease the value of the total developer time for the combat game.

In some embodiments, the quality ranking can be produced for games within categories, themes, genres, etc. For instance, puzzle games can belong to one category and role-playing games (RPGs) can belong to another category. As such, a particular puzzle game can be ranked by the management server 208 (based on a quality determination derived from its game developer time) relative to other puzzle games, and a particular RPG can be ranked by the management server 208 (based on a quality determination derived from its game developer time) relative to other RPGs. In this manner, electronic games that have similar complexity and that are expected to have similar game development times, can be grouped together. In other embodiments, a ranking may be performed across categories, with a weight for example, for each category.

FIG. 4 shows example information pertaining to the quality of an electronic game and which may be based at least in part on the developer time while using the game development tool 100 of FIG. 1 (and/or the game development tool 202 in FIG. 2), in accordance with some implementations. The quality of the electronic game may be represented in a ranking 400, which may be embodied by the ranking 210 in FIG. 2. In the ranking 400, GAME A is ranked higher relative to another GAME D and is ranked lower relative to GAMES B, C, and F. This position of GAME A in the ranking 400 may be due to GAME A having a lengthier total developer time than GAME D and a shorter total developer time than GAMES B, C, and F. The management server 208 may perform a comparison of total developer times between the electronic games in order to generate the ranking 400, singly or in combination with other factors that provide an indication of quality (e.g., ratings provided by players, reviews, etc.).

Examples of the alert 212 of FIG. 2 are shown as alerts 402 and 404 in FIG. 4. The management server 208 may generate the alert 402 for a malicious game, if the electronic game has a low quality rating that results from a short total developer time and is found to contain certain keywords that suggest a malicious intent (e.g., prompts for a username, password, credit card number, social security number, payment, etc.). The alert 402 may indicate that such keywords are present in the electronic game. The management server 208 may compare the words/text in the electronic game with a reference list of keywords stored in the storage device 216, in order to make a determination of whether to generate the alert 402.

Moreover, the storage device 216 may contain the profile information for the game developer. For instance, if the game developer is associated with several other low quality games, at least some of which have been disabled for being malicious games, then the management server 208 can generate the alert 402 to prompt a system administrator to further examine the current electronic game. Other information stored in the storage device 216, in combination with the short game developer time for the electronic game, may be indicative of whether the current game may be a malicious game that would justify generation of the alert 402, such as the game developer being a newly registered user, the game developer has created/upload a high number of electronic games (e.g., 10 or more electronic games) within a single day wherein each of these electronic games have total (short) game developer times that are lower than a threshold, the game developer has a short developer history, etc.

The alert 404 provides an example of an alert for an electronic game that may have inappropriate content, such as adult-oriented content for an electronic game disguised as a children's game. As with the alert 402, the management server 208 may generate the alert 404 if the electronic game is associated with a short developer time, and if certain keywords are detected in the electronic game (including profanity), such as in the title of the electronic game or within the electronic game.

Figure 5:
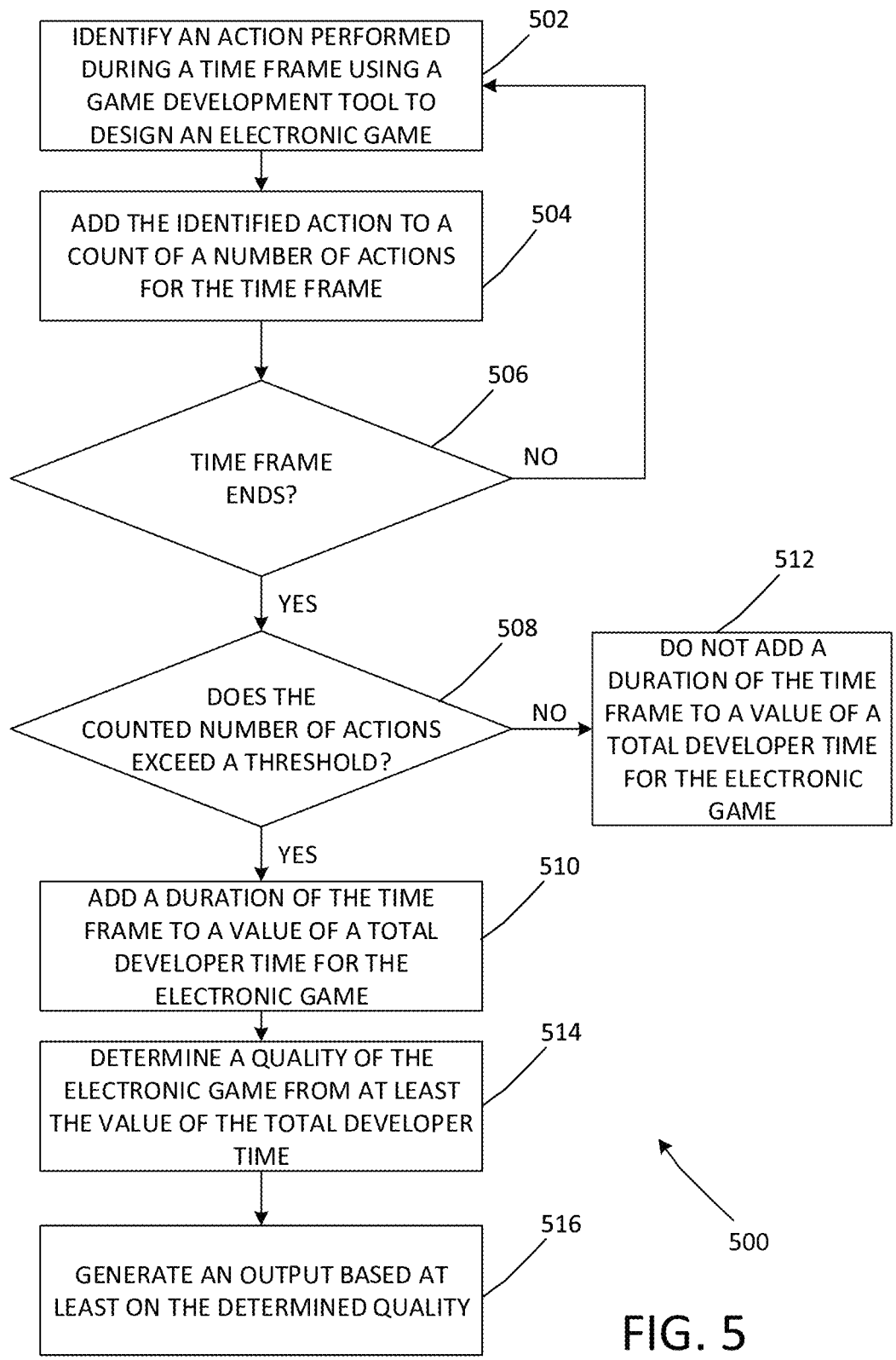
FIG. 5 is a flowchart illustrating an example method to determine the quality of an electronic game, in accordance with some implementations.

FIG. 5 is a flowchart illustrating an example method 500 to determine the quality of an electronic game, in accordance with some implementations. For instance, game developer time may be used as a factor in determining the quality of an electronic game. The example method 500 may include one or more operations illustrated by one or more blocks, such as blocks 502 to 516. The various blocks of the method 500 and/or of any other process(es) described herein may be combined into fewer blocks, divided into additional blocks, supplemented with further blocks, and/or eliminated based upon the desired implementation. In some embodiments, the method 500 may be implemented upon permission from the game developer to identify and use actions performed using a game development tool to design an electronic game.

The method 500 of FIG. 5 is explained herein with reference to the elements shown in FIGS. 1-4. In some embodiments, the operations of the method 500 may be performed by the activity tracker 206 in a pipelined sequential manner. In other embodiments, some operations may be performed out-of-order, in parallel, etc. by the activity tracker 206. For the sake of simplicity of explanation, the operations in the method 500 will be described below in the context of the activity tracker 206 performing most or all of the operations. In other embodiments, some or all of the operations may be performed by the management server 208 or by some other element in an online gaming system.

At a block 502 ("IDENTIFY AN ACTION PERFORMED DURING A TIME FRAME USING A GAME DEVELOPMENT TOOL TO DESIGN AN ELECTRONIC GAME"), the game developer has launched the game development tool 100 (or the game development tool 202) in order to design an electronic game. The activity tracker 206 identifies an action that the game developer has taken during a time frame using the game development tool 100, such as a drag and drop action. The block 502 may be followed by a block 504.

At the block 504 ("ADD THE IDENTIFIED ACTION TO A COUNT OF A NUMBER OF ACTIONS FOR THE TIME FRAME"), the activity tracker 206 determines that the identified action is an appropriate action that can be counted, and adds the action to a count of the number of actions for the time frame. The block 504 may be followed by a block 506.

At the block 506 ("TIME FRAME ENDS?"), the activity tracker 206 determines whether the time frame has ended, such as whether a duration of 30 minutes has elapsed since a first action was taken during the time frame. If the time frame has not ended ("NO" at the block 506), then the method 500 returns to the block 502 to identify further actions that are performed during the time frame.

If, at the block 506, the activity tracker 206 determines that the time frame has ended ("YES" at the block 506), then the activity tracker 206 determines at a block 508 whether the counted number of actions during the time frame exceed a threshold ("DOES THE COUNTED NUMBER OF ACTIONS EXCEED A THRESHOLD?"). If the threshold is exceeded ("YES" at the block 508), then the activity tracker 206 adds the duration of the time frame to a value of a total developer time for the electronic game, at a block 510 ("ADD A DURATION OF THE TIME FRAME TO A VALUE OF A TOTAL DEVELOPER TIME FOR THE ELECTRONIC GAME").

If, however, the threshold is not exceeded ("NO" at the block 508), then the duration of the time frame is not added to a value of a total developer time for the electronic game, at a block 512 ("DO NOT ADD A DURATION OF THE TIME FRAME TO A VALUE OF A TOTAL DEVELOPER TIME FOR THE ELECTRONIC GAME").

The block 510 may be followed by a block 514 ("DETERMINE A QUALITY OF THE ELECTRONIC GAME FROM AT LEAST THE VALUE OF THE TOTAL DEVELOPER TIME"). At the block 514, the management server 208 may receive or calculate the total developer time for the electronic game (such as via the signal 207 from the activity tracker 206), and then determine the quality of the electronic game from at least the value of the total developer time. For instance, a lengthier total developer time may correspond to a higher quality for the electronic game, and a shorter total developer time may correspond to a lower quality for the electronic game. The shorter developer time, in combination with information from the storage device 216, may also cause the management server 216 to determine that the electronic game is a low quality game because of potential malicious content. The block 514 may be followed by a block 516.

At the block 516 ("GENERATE AN OUTPUT BASED AT LEAST ON THE DETERMINED QUALITY"), the management server 208 may generate an output such as the rankings 220 and 400, or the alerts 212 and 402 and 404, based at least in part on the determined quality. For example, if the electronic game is determined to be of low quality due to shorter developer time and the presence of malicious content, the management server 208 can generate an alert that is sent to a system administrator, so as to enable the system administrator to further analyze the electronic game. The system administrator can then take an appropriate remedial action, such as deleting or disabling the game, or permitting the game to publish.

Figure 6:
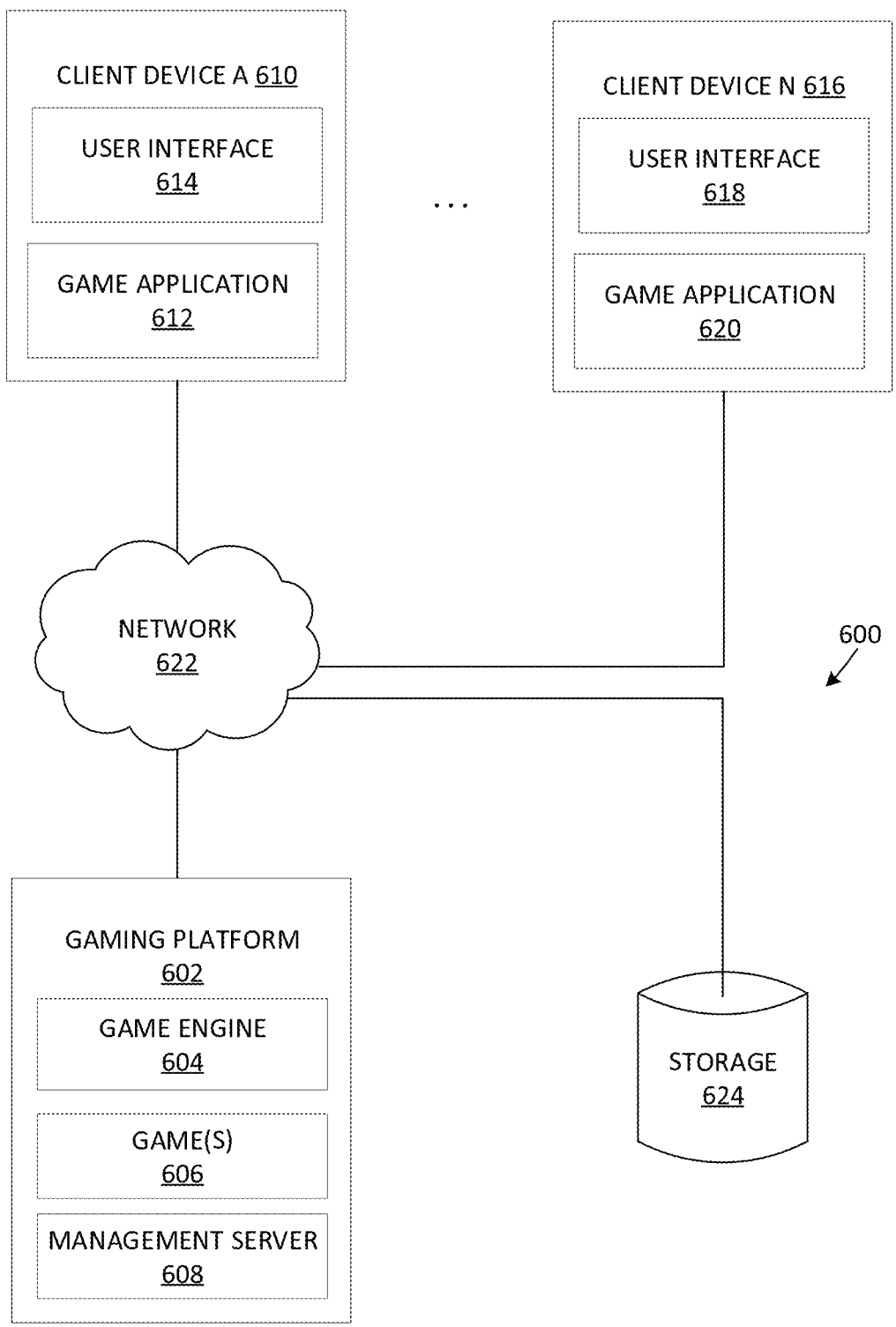
FIG. 6 is a diagram of an example system architecture for online gaming that can use game developer time to determine the quality of an electronic game, in accordance with some implementations.

FIG. 6 is a diagram of an example system architecture for online gaming that can use game developer time to determine the quality of an electronic game, in accordance with some implementations. Online gaming platforms (also referred to as "user-generated content platforms" or "user-generated content systems") offer a variety of ways for users to interact with one another, such as while the users are playing an electronic game. For example, users of an online gaming platform may work together towards a common goal, share various virtual gaming items, send electronic messages to one another, and so forth. Users of an online gaming platform may play games using characters, such as an avatar, which players can navigate through a 3D world rendered in the electronic game.

An online gaming platform may also allow users of the platform to design electronic games, using the game development tools described above. For example, users of the online gaming platform may be allowed to create, design, and customize graphical objects in an electronic game, such as walls, windows, landscapes, characters, and other objects in a 3D world.

In FIG. 6, an example system architecture 600 (also referred to as "system" herein) includes an online gaming platform 602, a first client device 610 (generally referred to as "client device(s) 610" herein) and at least one second client device 616. The online gaming platform 602 can include, among other things, a game engine 604 and one or more electronic games 606 that were designed by game developers. The online gaming platform 602 may also include a management server 608 (which may be the management server 208 in FIG. 2), which in turn may be embodied by or operatively coupled to an agent computer. The system architecture 600 is provided for illustration of one possible implementation. In other implementations, the system architecture 600 may include the same, fewer, more, or different elements configured in the same or different manner as that shown in FIG. 6.

A communication network 622 may be used for communication between the online gaming platform 602 and the client devices 610/616, and/or between other elements in the system architecture 600. The network 622 may include a public network (e.g., the Internet), a private network (e.g., a local area network (LAN) or wide area network (WAN)), a wired network (e.g., Ethernet network), a wireless network (e.g., an 802.11 network, a Wi-Fi network, or wireless LAN (WLAN)), a cellular network (e.g., a long term evolution (LTE) network), routers, hubs, switches, server computers, or a combination thereof.

The client device 610 can include a game application 612 and one or more user interfaces 614 (e.g., an interface presented by audio/video input/output devices). The client device 616 can include a game application 620 and user interfaces 618 (e.g., audio/video input/output devices). The audio/video input/output devices can include one or more of a microphone, speakers, headphones, display device, etc. In some embodiments, the game applications 612 and 620 can include the electronic game 204 that is designed by the game developer, the game development tools 100 or 202, and the activity tracker 206.

The system architecture 600 may further include one or more storage devices 624. The storage device 604 may be, for example, a storage device located within the online gaming platform 602 or communicatively coupled to the online gaming platform 602 via the network 622 (such as depicted in FIG. 6). The storage device 624 may be embodied by the storage device 216 in FIG. 2, and may store, for example, graphical objects that are rendered in an electronic game 606 by the game engine 604 or by the game applications 612/620, as well as the configuration/properties information of the graphical objects.

In some embodiments, the storage device 624 can be part of a separate content delivery network that provides the graphical objects rendered in the game 606. For instance, the game application 612 may pull (or have pushed to it) graphical objects stored in the storage device 624, for presentation during the course of playing the game. The storage device 624 may also store developer profile information, game developer statistics, keywords, ranking data, and the various other pieces of information described above in connection with determining the quality of an electronic game and generating an output such as a ranking or an alert.

In one implementation, the storage device 624 may be a non-transitory computer readable memory (e.g., random access memory), a cache, a drive (e.g., a hard drive), a flash drive, a database system, or another type of component or device capable of storing data and other content. The storage device 624 may also include multiple storage components (e.g., multiple drives or multiple databases) that may also span multiple computing devices (e.g., multiple server computers).

In some implementations, the online gaming platform 602 can include a server having one or more computing devices (e.g., a cloud computing system, a rackmount server, a server computer, cluster of physical servers, etc.). In some implementations, a server may be included in the online gaming platform 602, be an independent system, or be part of another system or platform.

In some implementations, the online gaming platform 602 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 602 and to provide a user with access to online gaming platform 602. The online gaming platform 602 may also include a website (e.g., a webpage) or application back-end software that may be used to provide a user with access to content provided by online gaming platform 602. For example, a user may access online gaming platform 602 using the game application 612 on the client device 610.

In some implementations, online gaming platform 602 may be a type of social network providing connections between users or a type of user-generated content system that allows users (e.g., end-users or consumers) to communicate with other users on the online gaming platform 602, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, the online gaming platform 602 may be a virtual gaming platform. For example, the gaming platform may provide single-player or multiplayer games to a community of users that may design or access or interact with games using client devices 610 via the network 622. In some implementations, games (also referred to as "video game," "online game," or "virtual game" etc. herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to interaction of one or more players using client devices (e.g., the client device 610 and/or 616) within a game (e.g., the game 606) or the presentation of the interaction on a display or other user interfaces (e.g., the user interface 614/618) of a client device 610 or 616.

In some implementations, the game 606 can include an electronic file that can be executed or loaded using software, firmware or hardware configured to present the game content (e.g., digital media item) to an entity. In some implementations, the game application 612 may be executed and the game 606 rendered in connection with the game engine 604. In some implementations, the game 606 may have a common set of rules or common goal, and the environments of a game 606 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a 3D environment. The one or more environments of the game 606 may be collectively referred to a "world" or "gaming world" or "virtual world" or "universe" herein. An example of a world may be a 3D world of a game, such as the "Infinite Runner" game illustrated in FIG. 1 above. For example, a user may build a virtual environment that is linked to another virtual environment created by another user. A character of the virtual game may cross the virtual border to enter the adjacent virtual environment.

It may be noted that 3D environments or 3D worlds use graphics that provide a three-dimensional representation of geometric data representative of game content (or at least present game content to appear as 3D content whether or not 3D representation of geometric data is used). 2D environments or 2D worlds use graphics that provide two-dimensional representation of geometric data representative of game content.

In some implementations, the online gaming platform 602 can host one or more games 606 that are designed by game developers and can permit users to interact with the games 606 using the game application 612 of the client device 610. Users of the online gaming platform 602 may play, create, interact with, or build games 606, communicate with other users, and/or create and build objects (e.g., also referred to as "item(s)" or "game objects" or "virtual game item(s)" or "graphical objects" herein) of games 606. For example, in generating user-generated virtual items, users may create characters, animation for the characters, decoration for the characters, one or more virtual environments for an interactive game, or build structures used in the game 606, among others. In some implementations, users may buy, sell, or trade game virtual game objects, such as in-platform currency (e.g., virtual currency), with other users of the online gaming platform 602.

In some implementations, online gaming platform 602 may transmit game content to game applications (e.g., the game application 612). In some implementations, game content (also referred to as "content" herein) may refer to any data or software instructions (e.g., game objects, game, user information, video, images, commands, media item, etc.) associated with online gaming platform 602 or game applications. In some implementations, game objects (e.g., also referred to as "item(s)" or "objects" or "virtual game item(s)" herein) may refer to objects that are used, created, shared, or otherwise depicted in the game 606 of the online gaming platform 602 or game applications 612 or 620 of the client devices 610/616. For example, game objects may include a part, model, character or components thereof (like faces, arms, lips, etc.), tools, weapons, clothing, buildings, vehicles, currency, flora, fauna, components of the aforementioned (e.g., windows of a building), and so forth.

It may be noted that the online gaming platform 602 hosting games 606, is provided for purposes of illustration. In some implementations, online gaming platform 602 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, one or more of the games 606 may be associated with a particular user or a particular group of users (e.g., a private game), or made widely available to users of the online gaming platform 602 (e.g., a public game). In some implementations, where online gaming platform 602 associates one or more games 606 with a specific user or group of users, online gaming platform 602 may associate the specific user(s) with a game 606 using user account information (e.g., a user account identifier such as username and password).

In some implementations, online gaming platform 602 or client devices 610/616 may include the game engine 604 or game application 612/620. In some implementations, game engine 604 may be used for the development or execution of games 606. For example, game engine 406 may include functionality of a game development tool, such as a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 604 may generate commands that help compute and render the game (e.g., rendering commands, collision commands, animation commands, physics commands, etc.) In some implementations, game applications 612/618 of client devices 610/616, respectively, may work independently, in collaboration with game engine 604 of online gaming platform 602, or a combination of both.

In some implementations, both the online gaming platform 602 and client devices 610/616 execute a game engine or a game application (604, 612, 620, respectively). The online gaming platform 602 using game engine 604 may perform some or all the game engine functions (e.g., generate physics commands, animation commands, rendering commands, etc., including controlling the changes to the camera views described above), or offload some or all the game engine functions to the game application 612 of client device 610. In some implementations, each game 606 may have a different ratio between the game engine functions that are performed on the online gaming platform 602 and the game engine functions that are performed on the client devices 610 and 616.

For example, the game engine 604 of the online gaming platform 602 may be used to generate physics commands in cases where there is a collision between at least two game objects, while the additional game engine functionality (e.g., generate rendering commands, including changing the camera views) may be offloaded to the client device 610. In some implementations, the ratio of game engine functions performed on the online gaming platform 602 and client device 610 may be changed (e.g., dynamically) based on gameplay conditions. For example, if the number of users participating in gameplay of a particular game 606 exceeds a threshold number, the online gaming platform 602 may perform one or more game engine functions that were previously performed by the client devices 610 or 616.

For example, users may be playing a game 606 on client devices 610 and 616, and may send control instructions (e.g., user inputs, such as right, left, up, down, user election, or character position and velocity information, etc.) to the online gaming platform 602. Subsequent to receiving control instructions from the client devices 610 and 616, the online gaming platform 602 may send gameplay instructions (e.g., position and velocity information of the characters participating in the group gameplay or commands, such as rendering commands, collision commands, etc.) to the client devices 610 and 616 based on control instructions.

For instance, the online gaming platform 602 may perform one or more logical operations (e.g., using game engine 606) on the control instructions to generate gameplay instruction for the client devices 610 and 616. In other instances, online gaming platform 602 may pass one or more or the control instructions from one client device 610 to other client devices (e.g., the client device 616) participating in the game 606. The client devices 610 and 616 may use the gameplay instructions and render the gameplay for presentation on the displays of client devices 610 and 616, including the adjustable camera views described above.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 602. In other implementations, the control instructions may be sent from the client device 610 to another client device (e.g., the client device 616), where the other client device generates gameplay instructions using the local game engine application 620. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow the client device 110 to render gameplay of a game, such as a multiplayer game. The gameplay instructions may include one or more of user input (e.g., control instructions), character position and velocity information, or commands (e.g., physics commands, animation commands, rendering commands, collision commands, etc.).

In some implementations, the client device(s) 610 or 616 may each include computing devices such as personal computers (PCs), mobile devices (e.g., laptops, mobile phones, smart phones, tablet computers, or netbook computers), network-connected televisions, gaming consoles, etc. In some implementations, a client device 610 or 616 may also be referred to as a "user device." In some implementations, one or more client devices 610 or 616 may connect to the online gaming platform 602 at any given moment. It may be noted that the number of client devices 610 or 616 is provided as illustration, rather than limitation. In some implementations, any number of client devices 610 or 616 may be used.

In some implementations, each client device 610 or 616 may include an instance of the game application 612 or 620, respectively. In one implementation, the game application 612 or 620 may permit users to use and interact with online gaming platform 602, such as control a virtual character in a virtual game hosted by online gaming platform 602, or view or upload content, such as games 606, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 610 or 616 and allows users to interact with online gaming platform 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 612/620 may be an online gaming platform application (such as the game development tools described above) for users to build, create, edit, upload content to the online gaming platform 602 as well as interact with online gaming platform 602 (e.g., play games 606 hosted by online gaming platform 602). As such, the game application 612/620 may be provided to the client device 610 or 616 by the online gaming platform 602. In another example, the game application may be an application that is downloaded from a server.

In some implementations, a user may login to online gaming platform 602 via the game application. The user may access a user account by providing user account information (e.g., username and password) where the user account is associated with one or more characters available to participate in one or more games 606 of online gaming platform 602.

In general, functions described in one implementation as being performed by the online gaming platform 602 can also be performed by the client device(s) 610 or 616, or a server, in other implementations if appropriate. In addition, the functionality attributed to a particular component can be performed by different or multiple components operating together. The online gaming platform 602 can also be accessed as a service provided to other systems or devices through appropriate application programming interfaces (APIs), and thus is not limited to use in websites.

Figure 7:
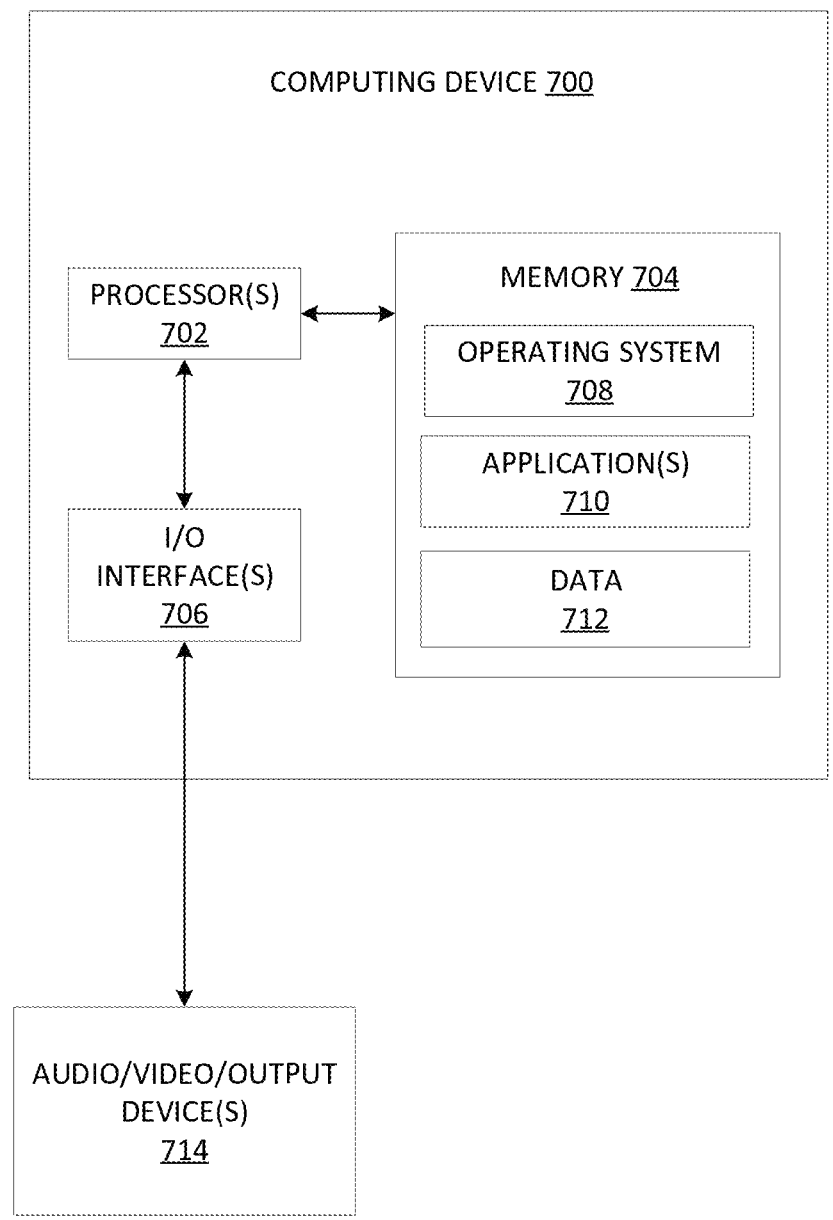
FIG. 7 is a block diagram illustrating an example computing device, in accordance with some implementations.

FIG. 7 is a block diagram of an example computing device 700 which may be used to implement one or more features described herein. The client devices 610 and 616 and/or the gaming platform 602 of FIG. 6 may be provided in the form of the computing device 700 of FIG. 7. In one example, the computing device 700 may be used to perform the methods described herein to determine the actions performed during a time frame while using a game development tool and then to compute a total developer time from the time frames and to determine a quality of the electronic game. The computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, the device 700 includes a processor 702, a memory 704, an input/output (I/O) interface 706, and audio/video input/output devices 714.

The processor 702 can be one or more processors and/or processing circuits to execute program code and control basic operations of the computing device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

The memory 704 may be provided in the computing device 700 for access by the processor 702, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 702 and/or integrated therewith. The memory 704 can store software executable on the computing device 700 by the processor 702, including an operating system 708, one or more applications 710 and its related data 712. The application 710 can be used to embody the game applications 612/620 or the game engine 604, as well as the game development tools 100 and 202 and the activity tracker 206. In some implementations, the application 710 can include instructions that, in response to execution by the processor 702, enable the processor 702 to perform or control performance of the operations described herein with respect to determining developer time associated with an electronic game and determining a quality based at least in part on the developer time.

Any of software in the memory 704 can alternatively be stored on any other suitable storage location or computer-readable medium. In addition, memory 704 (and/or other connected storage device(s)) can store instructions and data used in the features described herein. The memory 704 and any other type of storage (magnetic disk, optical disk, magnetic tape, or other tangible media) can be considered "storage" or "storage devices."

The I/O interface 706 can provide functions to enable interfacing the computing device 700 with other systems and devices. For example, network communication devices, storage devices, and input/output devices can communicate with the computing device 700 via an I/O interface 706. In some implementations, the I/O interface 706 can connect to interface devices including input devices (keyboard, pointing device, touchscreen, microphone, camera, scanner, etc.) and/or output devices (display device, speaker devices, printer, motor, etc.), which are collectively shown as at least one audio/video input/output device 714.

The audio/video input/output devices 714 can include an audio input device (e.g., a microphone, etc.) that can be used to receive audio messages as input, an audio output device (e.g., speakers, headphones, etc.) and/or a display device, that can be used to provide graphical and visual output such as the example layout and elements of the game development tool 100 described above.

For ease of illustration, FIG. 7 shows one block for each of processor 702, memory 704, I/O interface 706, the application 710, etc. These blocks may represent one or more processors or processing circuitries, operating systems, memories, I/O interfaces, applications, and/or software modules. In other implementations, the device 700 may not have all of the components shown and/or may have other elements including other types of elements instead of, or in addition to, those shown herein.

A user device can also implement and/or be used with features described herein. Example user devices can be computer devices including some similar components as the computing device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., the method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. field-programmable gate array (FPGA), complex programmable logic device), general purpose processors, graphics processors, application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A method, comprising:
   determining, by an activity tracker at a first computer, a number of actions performed using a game development tool, wherein the number of actions are performed during first and second time frames, and wherein the actions correspond to a particular game designed using the game development tool;
   generating, by the activity tracker, a signal having content that represents the number of actions taken during the first and second time frames;
   sending, by the activity tracker, the signal to an agent computer;
   determining, by the agent computer, a quality of the particular game from the content of the signal, wherein the quality of the particular game corresponds to a total developer time that includes a first duration of the first time frame in which a first number of actions exceeds a first threshold and excludes a second duration of the second time frame in which a second number of actions is below the first threshold; and
   in response to the determined quality of the particular game being below a second threshold to thereby indicate a low total developer time, generating and sending, by the agent computer, an alert to a system administrator to investigate the particular game.

2. The method of claim 1, wherein:
   determining the number of actions includes:
      determining the first number of actions that occur during the first time frame;
      adding the first duration of the first time frame to the total developer time to provide a current value of the total developer time, in response to the first number of actions exceeding the first threshold;
      determining the second number of actions that occur during the second time frame; and
      maintaining the current value of the total developer time, by not adding the second duration of the second time frame to the current value of the total developer time, in response to the second number of actions failing to exceed the first threshold, and generating the signal having the content that represents the number of actions includes providing the current value of the total developer time in the signal.

3. The method of claim 2, wherein determining the quality of the particular game includes ranking the particular game higher relative to other games, in response to the current value of the total developer time being higher than corresponding values of respective developer times of the other games.

4. The method of claim 2, wherein determining the quality of the particular game includes ranking the particular game lower relative to other games, in response to the current value of the total developer time being lower than corresponding values of respective developer times of the other games.

5. The method of claim 2, wherein:
   determining the quality of the particular game includes ranking the particular game relative to other games based on a comparison of the current developer time to respective developer times of the other games,
   the method further comprises:
      receiving a query for games;
      determining a set of games that matches the query; and presenting the particular game in a hit list, and
   a position of the particular game on the hit list is based on the ranking of the particular game relative to respective rankings of the other games.

6. The method of claim 1, further comprising identifying the particular game as a potential malicious game, in response to a value of the low total developer time being below a total developer time threshold and after investigation of contents of the particular game in response to the alert.

7. The method of claim 6, wherein identifying the particular game as the potential malicious game further includes at least one of:
   identifying at least one word, in a title of the particular game or within the particular game, which is indicative of a scam or explicit content;
   identifying a user of the game development tool as having a short developer history;
   identifying at least one other game, developed by the user, that has a current developer time that is lower than the total developer time threshold; or
   determining that the user has developed a plurality of games within a single time period, wherein each game has a current developer time that is lower than the total developer time threshold.

8. The method of claim 1, wherein the first and second time frames each have a duration of at least 30 minutes.

9. A non-transitory computer-readable medium having computer-readable instructions stored thereon, which in response to execution by a processor, cause the processor to perform or control performance of operations that comprise:
   determining, by an activity tracker at a first computer, a number of actions that are performed using a game development tool, wherein the number of actions are performed during-first and second time frames, and wherein the actions correspond to a particular game designed using the game development tool;
   generating, by the activity tracker, a signal having content that represents the number of actions taken during the first and second time frames; and
   sending, by the activity tracker, the signal to an agent computer to enable a determination, by the agent computer, of a quality of the particular game from the content of the generated signal, wherein the quality of the particular game corresponds to a total developer time that includes a first duration of the first time frame in which a first number of actions exceeds a first threshold and excludes a second duration of the second time frame in which a second number of actions is below the first threshold, and wherein an alert to investigate the particular game is generated and sent by the agent computer to a system administrator in response to the determined quality of the particular game being below a second threshold to thereby indicate a low total developer time.

10. The non-transitory computer-readable medium of claim 9, wherein:
    determining the number of actions includes:
       determining the first number of actions that occur during the first time frame;
       adding the first duration of the first time frame to the total developer time to provide a current value of the total developer time, in response to the first number of actions exceeding the first threshold;
       determining the second number of actions that occur during the second time frame; and
       maintaining the current value of the total developer time, by not adding the second duration of the second time frame to the current value of the total developer time, in response to the second number of actions failing to exceed the first threshold, and
    generating the signal having the content that represents the number of actions includes providing the current value of the total developer time in the signal.

11. The non-transitory computer-readable medium of claim 10, wherein the determination of the quality of the particular game includes ranking the particular game higher relative to other games, in response to the current value of the total developer time being higher than corresponding values of respective developer times of the other games.

12. The non-transitory computer-readable medium of claim 10, wherein the determination of the quality of the particular game includes ranking the particular game lower relative to other games, in response to the current value of the total developer time being lower than corresponding values of respective developer times of the other games.

13. The non-transitory computer-readable medium of claim 10, wherein:
    the determination of the quality of the particular game includes ranking the particular game relative to other games based on a comparison of the current developer time to respective developer times of the other games,
    the operations further comprise:
       identifying a query for games;
       determining a set of games that matches the query; and presenting the particular game in a hit list, and
    a position of the particular game on the hit list is based on the ranking of the particular game relative to respective rankings of the other games.

14. The non-transitory computer-readable medium of claim 9, wherein the operations further comprise:
    identifying the particular game as a potential malicious game, in response to a value of the low total developer time being below a total developer time threshold and after investigation of contents of the particular game in response to the alert, and further due to at least one of:
       identification of at least one word, in a title of the particular game or within the particular game, which is indicative of a scam or explicit content;
       identification of a user of the game development tool as having a short developer history;

identification of at least one other game, developed by the user, that has a current developer time that is lower than the total developer time threshold; or determination that the user has developed a plurality of games within a single time period, wherein each game has a current developer time that is lower than the total developer time threshold.

15. A system, comprising:
a non-transitory computer-readable medium with computer-executable instructions stored thereon for a game development tool and for an activity tracker associated with the game development tool; and
a processor at a first computer and coupled to the computer-readable medium, and operable to execute the instructions to render a user interface for the game development tool and to operate the activity tracker perform or control performance of operations that include:
  determine a number of actions performed using the game development tool, wherein the number of actions are performed during first and second time frames, and wherein the actions correspond to a particular game designed using the game development tool;
  generate a signal having content that represents the number of actions taken during the first and second time frames; and
  send the signal to an agent computer to enable a determination, by the agent computer, of a quality of the particular game from the content of the generated signal, wherein the quality of the particular game corresponds to a total developer time that includes a first duration of the first time frame in which a first number of actions exceeds a first threshold and excludes a second duration of the second time frame in which a second number of actions is below the first threshold, and wherein an alert to investigate the game is generated and sent by the agent computer to a system administrator in response to the determined quality of the particular game being below a second threshold to thereby indicate a low total developer time.

16. The system of claim 15, wherein the activity tracker executes as a background process that is inaccessible to a user of the game development tool.

17. The system of claim 15, wherein:
the threshold includes a first threshold,
the operations to determine the number of actions includes operations to:
  determine the first number of actions that occur during the first time frame;
  add the first duration of the first time frame to the total developer time to provide a current value of the total developer time, in response to the first number of actions exceeding the first threshold;
  determine the second number of actions that occur during the second time frame; and
  maintain the current value of the total developer time, by not having the second duration of the second time frame added to the current value of the total developer time, in response to the second number of actions failing to exceed the first threshold, and
the operations to generate the signal having the content that represents the number of actions include an operation to provide the current value of the total developer time in the signal.

18. The system of claim 17, wherein to determine the quality of the particular game, the agent computer is operable to:
rank the particular game higher relative to other games, in response to the current value of the total developer time being higher than corresponding values of respective developer times of the other games; and
rank the particular game lower relative to other games, in response to the current value of the total developer time being lower than corresponding values of respective developer times of the other games.

19. The system of claim 17, wherein:
to determine the quality of the particular game, the agent computer is operable to rank the particular game relative to other games based on a comparison of the current developer time to respective developer times of the other games,
the user interface is operable to present the particular game in a hit list that is generated in response to a query for games, and
a position of the particular game on the hit list is based on the rank of the particular game relative to respective rankings of the other games.

20. The system of claim 15, wherein the agent computer is operable to identify the particular game as a potential malicious game, in response to a value of the low total developer time being below a total developer time threshold and after investigation of contents of the game in response to the alert, and further due to at least one of:
identification of at least one word, in a title of the particular game or within the particular game, which is indicative of a scam or explicit content;
identification of a user of the game development tool as having a short developer history;
identification of at least one other game, developed by the user, that has a current developer time that is lower than the total developer time threshold; or
determination that the user has developed a plurality of games within a single time period, wherein each game has a current developer time that is lower than the total developer time threshold.

* * * * *